UNITED STATES PATENT OFFICE.

MICHAEL A. GOLOSEIEFF, OF NEW YORK, N. Y.

FERTILIZER.

SPECIFICATION forming part of Letters Patent No. 500,100, dated June 20, 1893.

Application filed April 16, 1892. Serial No. 429,400. (No specimens.)

*To all whom it may concern:*

Be it known that I, MICHAEL A. GOLOSEIEFF, a subject of the Emperor of Russia, and a resident of New York, in the county of New York and State of New York, have invented certain new and useful Improvements in Composition of Matter; and I do declare the following to be a full, clear, and exact description of the invention, such as will enable others skilled in the art to which it appertains to make and use the same.

This invention has relation to a certain new and useful composition of matter designed for use as a soil fertilizer; and it consists in the novel combination of the ingredients hereinafter specified, and in the process or method of combining the same.

The object of the invention is to make use of a valuable ingredient which is present in the fat, off-cuts, and viscera of all animals (except swine), used in the manufacture of tallow. This ingredient is the gelatine, which is present in large quantities (from fifteen to fifty per cent, according to the character of the meat or fat). In carrying out my invention, wherein this refuse is utilized in the manufacture of an effective soil fertilizer, I proceed as follows:

The gelatine refuse or broth, obtained by the melting of the tallow from the off-cuts, and viscera of animals, while still hot, is conducted from the tallow melting apparatus to a suitable evaporating bath. This may be of any known form, though the so called "vacuum boiler" is preferred. In this bath the gelatine broth is evaporated until it attains a specific gravity of 1.23 to 1.24, or acccording to the Baumé hydrometer of 27° to 28°; that is to say, the evaporated broth must contain about two thirds gelatine to one-third of water. The specific gravity of the evaporated broth may however, be increased or decreased at pleasure, if certain other steps of the process, hereinafter referred to, are correspondingly observed. The evaporated, thickened broth, is then conducted by suitable means into a mixing apparatus. This apparatus may be of any suitable form, although the results are more satisfactory if its capacity is somewhat limited, one capable of holding about one thousand pounds being preferred. Into this apparatus together with the evaporated gelatine is placed quick or unslaked lime (Ca.O) which has previously been reduced to a fine state and preferably sifted. The two substances are then thoroughly mixed together forming a homogeneous mass, somewhat resembling thin gruel. This mass is then poured into suitable receptacles, (which may be made of wood, or of thin metal sheets, and provided with handles for convenient handling by the workmen) of a capacity from three to four times greater than the volume of the poured mass. It is preferable to pour the fluid mass into the receptacle so that it will form a stratum of from four to eight inches thick (preferably not greater) weighing from one hundred to two hundred pounds. In a few minutes, the mass commences to rise in the receptacles, expanding from three to four times its original volume and becomes heated, although the surrounding temperature may be low. In a few hours, the mass becomes thoroughly dried forming a porous, homogeneous substance, which can easily be ground into fine powder, which is very effective for fertilizing purposes, containing as it does from seven to twelve per cent. of ammonia ($NH_3$) and from forty to sixty per cent. of lime (Ca.O). This difference in percentage depends upon the degree of evaporation of the gelatine broth, and the consequent variation in the amount of the lime mixed therewith, depending upon the amount of water left in the gelatine broth. Although departure from due proportion of the ingredients does not materially change the process or the composition, yet the product will not be equally homogeneous and dry, and the following proportions are preferred:

If the gelatine broth is evaporated to the normal thickness, *i. e.*, if it consists of two thirds dry gelatine, and one-third of water, by weight, then the lime should be mixed therewith in the proportion of five hundred parts of lime, by weight, to every one thousand parts of the broth; and if the gelatine broth contains equal parts of water and dry gelatine, then for every one thousand parts of the broth, seven hundred and fifty parts of the lime should be added. In other words, for every part of water contained in the broth, about one and one half parts of the lime should be added. I recommend however that the gelatine broth be always so evaporated that it will contain two-thirds of dry gelatine, and one-third of water, in which case, its specific gravity will be 1.23 to 1.24 or 27° to 28° Baumé.

In the process, the following reaction takes place: The quicklime (Ca.O) upon being mixed with the gelatine broth comes closely in contact with the water remaining in the broth, producing an increase of temperature, which expands the mass to three or four times its bulk. This causes the speedy evaporation of one half the water present, the remaining water uniting with the lime, forming dry slaked lime [Ca.(OH$_2$)]. The result is that no water actually present remains in the mass, and two entirely dry substances are obtained in a thoroughly mixed state.

The process above described is simple in its method, and does not require intricate or expensive apparatus, or large space for its carrying out, making use of a waste product, and converting it (without disagreeable odor) into a composition highly beneficial for agricultural purposes, the lime which is combined therewith for its preservation being a well known factor in agricultural fertilizers. The process is also beneficial from a sanitary point of view, as the refuse gelatine is prevented from infecting the air and waters in the places where the tallow melting establishments are located.

I am aware of the patent to Jensen, No. 378,688, granted February 28, 1888, wherein is set forth a process for utilizing tank refuse by drying it to a solid cake, which is then reduced and combined with lime, and I disclaim such process.

I am also aware that it is old to mix quicklime with tank-water, and subsequently evaporate and dry the mixture.

The important and distinguishing feature of my process consists in the only partial evaporation of the refuse broth before the lime is added, and causing the remainder of the water present after the partial evaporation, to be expelled by the heat produced by the addition of the lime, thereby avoiding the necessity for the complete evaporation of the broth, which is a process attended with considerable time and difficulty, owing to the liability to putrefaction.

Having described this invention, what I claim, and desire to secure by Letters Patent, is—

1. The herein described process of utilizing the gelatine refuse or broth from tallow manufactories as a soil fertilizer, which process consists in first partially evaporating said refuse or broth, to free it from a part of the water present therein, secondly, combining therewith quick or unslaked lime in a fine state, in the proportion of one and one-half parts of lime to each part of water remaining in the refuse or broth after such evaporation, and allowing such mixture to expand and dry, and finally, reducing the homogeneous porous mass formed by the second step to a powdered state, substantially as specified.

2. The herein described process of utilizing gelatine refuse or broth as a soil fertilizer, which consists in first evaporating the refuse or broth to the consistency of 27° to 28°, Baumé, second, combining therewith quick or unslaked lime in the proportion of five hundred parts of lime by weight, to every one thousand parts of the partially evaporated broth, third, allowing the mixed mass to expand and dry, and finally, reducing the homogeneous porous dried mass to a fine state, substantially as specified.

In testimony whereof I affix my signature in presence of two witnesses.

MICHAEL A. GOLOSEIEFF.

Witnesses:
N. A. BIBIKON,
NICHOLAS ALEINIKOFF.